Figure 1:
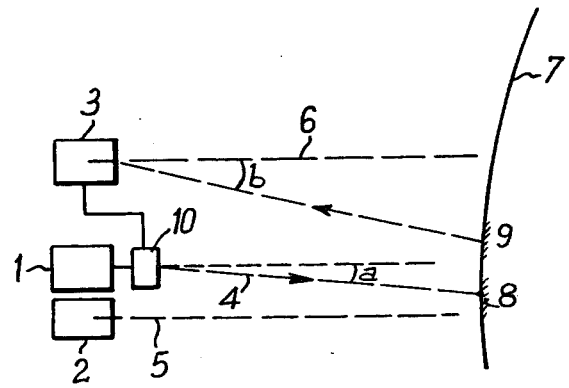

United States Patent [19]

Vauchy et al.

[11] 4,173,414
[45] Nov. 6, 1979

[54] METHOD AND APPARATUS FOR CORRECTING THE AIMING OF AN OPTICAL ILLUMINATOR ON A TARGET

[75] Inventors: Jean-Marie Vauchy, St-Cloud; Dominique de Ponteves, Flers, both of France

[73] Assignee: Societe de Fabrication d'Instruments de Mesure (S.F.I.M.), Massy, France

[21] Appl. No.: 778,499

[22] Filed: Mar. 17, 1977

[30] Foreign Application Priority Data

Oct. 18, 1976 [FR] France .................. 76 31252

[51] Int. Cl.² .................. G01B 11/26; F41G 7/00
[52] U.S. Cl. .................. 356/152; 89/41 L; 244/3.16; 356/141; 356/149
[58] Field of Search .................. 356/141, 152, 149; 244/3.13, 3.16; 89/41 L

[56] References Cited

U.S. PATENT DOCUMENTS

| | | | |
|---|---|---|---|
| 3,378,687 | 4/1968 | Schepler | 350/6.4 |
| 3,696,248 | 10/1972 | Cunningham et al. | 356/152 |
| 3,723,005 | 3/1973 | Smith | 356/152 |
| 3,766,826 | 10/1973 | Salomonsson | 89/41 L |
| 3,845,276 | 10/1974 | Kendy et al. | 89/41 L |
| 3,854,821 | 12/1974 | Thompson | 356/152 |
| 3,997,762 | 12/1976 | Ritchie et al. | 89/41 L |
| 4,097,155 | 6/1978 | Appert | 356/152 |

FOREIGN PATENT DOCUMENTS

| | | | |
|---|---|---|---|
| 2429006 | 8/1976 | Fed. Rep. of Germany | 356/152 |
| 2625081 | 8/1977 | Fed. Rep. of Germany | 356/152 |

Primary Examiner—S. C. Buczinski
Attorney, Agent, or Firm—Mason, Kolehmainen, Rathburn & Wyss

[57] ABSTRACT

The invention relates to the aiming of an optical illuminator on a target. The direction in which is seen the maximum light of the illuminator reflected by the target is detected, the angle formed by this direction and the direction of sight is measured and the result of this measurement is employed for controlling an orientation of the optical axis of the illuminator or of the optical axis of the sighting system, with the result that the direction in which is seen this maximum coincides with the optical axis of the sighting system. The invention is particularly applied to the sending of a moving body, provided with an optical, self-directing system, onto a target.

15 Claims, 4 Drawing Figures

METHOD AND APPARATUS FOR CORRECTING THE AIMING OF AN OPTICAL ILLUMINATOR ON A TARGET

The present invention relates to the aiming of an optical illuminator on a target.

The principle of aiming at a target by means of an illuminator is known: the illuminator radiates an energy towards the target, which energy is generally distributed symmetrically and in monotonously decreasing fashion about its optical axis, and the gun-layer observes the target through a sighting system of which the optical axis is materialised for example by a reticle projected ad infinitum, the line of sight and the axis of the illuminator having to be harmonized, i.e. strictly parallel, or merged, or of a determined convergence.

This harmonisation is sometimes not satisfactorily maintained or is defective, particularly when the illuminator and the reticle generator are connected to different structures or to a common, but deformable structure.

In the case of combat vehicles, in particular, the illuminator and the sighting system are often mounted at a certain distance from each other and very often the structures of the carrier vehicle are insufficiently rigid to allow and maintain a good spatial concordance of the axes of illumination and of sight. Such a phenomenon appears more particularly on helicopters whose structures are as light as possible and are affected at all times by continuous mechanical or vibratory forces.

It is an object of the invention to overcome the effects of this defect in harmonization, i.e. to correct the possible errors due to the deformations of the structure or structures which carry the illuminator and the sighting system.

The invention is applied particularly to the sending of a moving body, provided with an optical, self-directing system, onto a target, said moving body being for example a missile, shell or any other mobile weapon suitable for offensive action.

The self-directing means of the missile, which directs the missile towards a target illuminated by the optical beam from the illuminator, generally does not see the maximum of the energy reflected (or diffused) by the target where the maximum of incident energy is to be found, i.e. where the axis of the illuminator and the reticle of the sight are located on the target at the same time. The reason for this situation must be sought in the always optically and geometrically heterogeneous character of the target (tank, piece of ordnance, artillery, etc...), this heterogeneous character sometimes being voluntarily increased by the presence of optical decoys. The missile will therefore strike the target at the centre of the energy returned by said target, i.e. at a point other than the point aimed at. If the precision of modern sighting systems and active weapons is taken into consideration, which precision is of the order of a few decimeters at the distances of combat, an error of this order between centre of the incident energy and centre of the energy returned significantly reduces the accuracy of these weapons.

It is another object of the invention to overcome this drawback, i.e. to correct the possible errors due to the fact that the maximum of light reflected by the target is different from the point corresponding to the maximum of incident light.

Another source of defect in aiming lies in the possible existence of a parallax error due to the fact that the harmonization was effected for a determined distance and that this distance may vary.

It is a further object of the invention to overcome this drawback.

To this end, the present invention relates to a method wherein the direction in which is seen the maximum of the light of the illuminator reflected by the target is detected, the angle formed by this direction and the direction of sight is measured and the result of this measurement is employed to control an orientation of the optical axis of the illuminator or of the optical axis of the sighting system with the result that the direction in which is seen said maximum coincides with the optical axis of the sighting system.

According to a feature of the invention, an angular deviation measuring device (ADM device) adapted to receive the light of the illuminator reflected by the target is used as detector.

On the one hand, the optical axis of the illuminator is made to converge with the optical axis of the sighting system and the optical axis of the ADM device on the other hand, said ADM device supplying at least two deviation signals characterizing the angle existing between its optical axis and the direction in which it receives the maximum of reflected light.

These deviation signals are used for controlling an orientation the optical axis of the illuminator so that the maximum of reflected light comes onto the axis of the sighting system, or these deviation signals are used for controlling an orientation of the optical axis of the sighting system so that the maximum of reflected light comes onto the axis of the sighting system.

These deviation signals are generally a deviation signal in elevation and a deviation signal in azimuth, which can possibly be multiplexed.

The correction is preferably applied to the axis of the illuminator in order not to disturb the sighting operations, but it is not excluded to apply the correction to the axis of sight, for example by displacing the reticle.

An apparatus according to the invention for carrying out the method comprises, in manner known per se, a sighting system and an illuminator and further comprises an ADM device whose optical axis is harmonized with the optical axis of the sighting system, said ADM device being adapted to receive the light from the illuminator reflected by the target and to supply signals corresponding to the angular deviation existing between its optical axis and the direction in which it receives the maximum of reflected energy, deflecting means being associated with the ADM device for acting on the direction of the optical axis of the illuminator or of the sighting system as a function of the signals from the ADM device, in order to orientate the optical axis of the illuminator or that of the sighting system, so that the maximum of reflected energy comes onto the axis of the sighting system.

According to a feature of the apparatus according to the invention, the deflecting means comprise an optical deflector controlled by the deviation signals from the ADM device and placed on the trajectory of the beam from the illuminator or sighting system.

According to another feature, the optical deflector, the ADM device, the illuminator and the sighting system are mounted on a gyrostabilized platform.

According to a further feature, the deflecting means comprise two or more rotating prisms device controlled by the deviation signals from the ADM device and placed on the trajectory of the beam of the illuminator or the sighting system, upstream of a gyrostabilized optical reflector which is disposed on the trajectory of the beams of the illuminator, of the sight, of the ADM device for directing towards the target or receiving therefrom the considered light beams, in particular that of the illuminator.

According to yet another feature, the apparatus comprises two assemblies which are not rigidly connected together, namely a first assembly comprising a day sighting system, an illuminator and a gyrostabilized optical reflector sending the beam from the illuminator to the target and the image of the target towards the sight of the sighting system, and a second assembly comprising a gyrostabilized platform, and ADM device, possibly a night sighting system, these two assemblies being connected by such means that the reflector reproduces the movements of the platform, said reflector also being controllable directly or by the deviation signals from the ADM device.

The invention will be more readily understood with reference to the accompanying drawings, in which:

FIG. 1 shows a diagram illustrating the principle of the invention.

Figure 2:
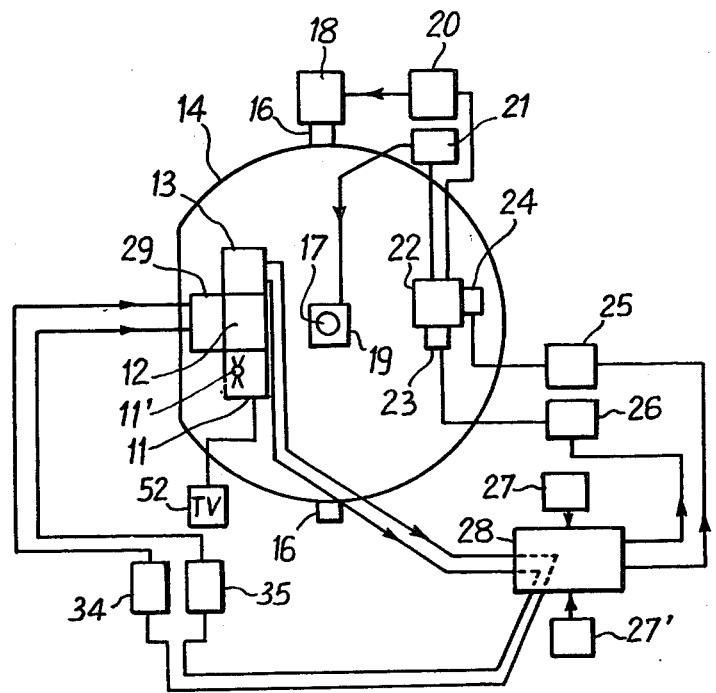
Figure 3:
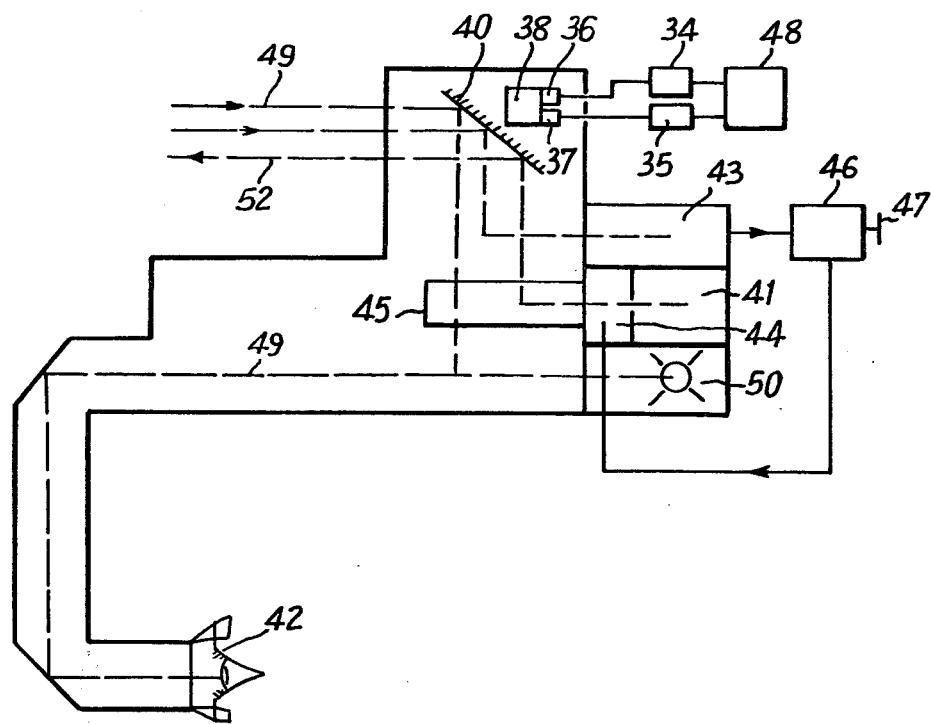
Figure 4:
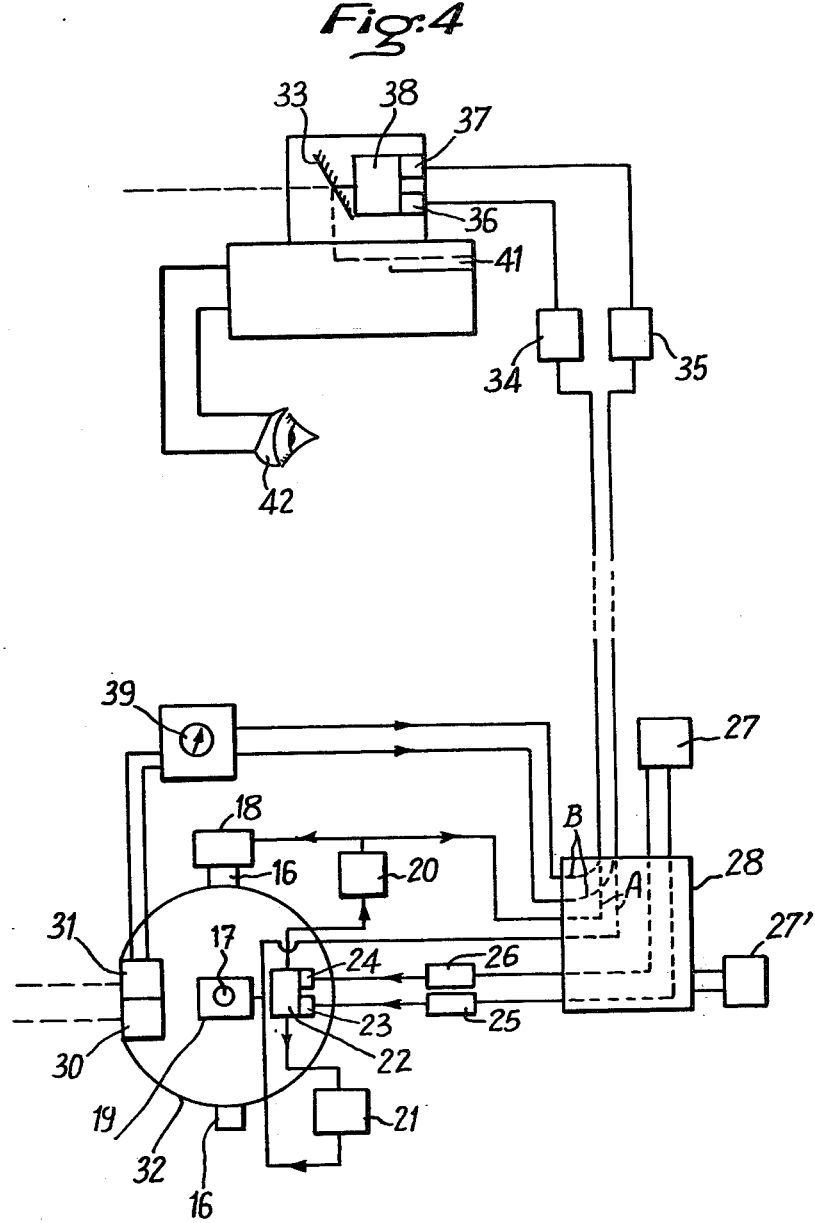

FIGS. 2 and 3 are diagrams of two apparatus for carrying out the invention, the only deviation to be corrected being assumed to be due to the fact that the point of the target which returns the maximum light towards the apparatus is distinct from the point of the target which receives the maximum of incident light of the illuminator, in the case of a day-night sight and a day sight, respectively, and FIG. 4 is a schematic diagram of an apparatus carrying out the invention in the case of a day-night sight such that there may also exist a deviation due to the sight system and the illuminator being in two assemblies which are not rigidly connected.

FIG. 1 schematically shows an illuminator 1, a sighting system 2 and an ADM device 3, whose optical axes are materialized by broken lines. It has been assumed that the optical axes 4 of the illuminator and 5 of the sighting system are not strictly parallel but make an angle a due to the fact, for example, that the illuminator and the sighting system are borne by a support which has undergone a deformation since the two axes had been harmonized.

A is generally of the order of several tens of milliradians whilst b (which will be mentioned hereinbelow) is of the order of 1 milliradian but may be clearly smaller.

The optical axis 6 of the ADM device is assumed to be parallel to the axis of the sighting system: it therefore also makes an angle a with the axis of the illuminator.

The target aimed at is assumed to be target 7 which receives at 8 the maximum of energy from the illuminator but which reflects the energy received with a maximum of reflection at a point 9, different from point 8.

The ADM device sees this maximum of reflected energy at an angle b and it supplies a corresponding signal. This signal actuates a device 10 which orientate the optical axis 4 of the illuminator until the ADM device issues a zero signal, thus at the same time correcting the deviation due to a and the deviation b due to the point 9 not merging with point 8.

The basic principle of the invention having been recalled, some particular embodiments thereof will now be described in detail, with reference to FIGS. 2 to 4.

In the embodiment of FIG. 2, the sighting system 11, the illuminator 12 and the ADM device 13 are mounted on the same gyroscopic platform 14.

This platform is a window(s) fitted equipment-carrying platform, hung on gimbals via trunnions 16 and 17, which are single (overhanging) or double. The movements of said platform about the axes of the trunnions (axes concurrent and perpendicular to each other) are controlled by electric, hydraulic or like motors 18 and 19. Each motor is preceded by a power amplifier 20 and 21 if necessary.

Each amplifier is attacked by the signals coming from a gyroscopic detector 22 with two degrees of freedom, securely connected to the platform so that its two axes correspond to the two possible rotations of the platform. The same gyroscope receives on the other hand two torque motors 23 and 24 which, under the action of electrical power signals coming from two amplifiers 25 and 26, precession along these two axes. The precession amplifiers are attacked by control signals coming from an "aiming stick" 27 with two degrees of freedom, through a switch box 28, whose role will described hereinbelow.

The ADM device is electro-optical, for example a four-quadrant diode, a reflecting prism with four faces each associated with a photomultiplier. An optical deflector 29 is placed either in front of the sighting system 11 or in front of the illuminator 12, irrespectively of the functioning of the apparatus. However, it is preferably placed in front of the illuminator 12 in order not to complicate the work of the gun-layer who aims the platform and therefore the sighting system, by means of the control stick 27.

The deflector is for example two (or more) rotating prisms device composed of two (or more) prisms in rotation with respect to each other, or a mobile reflecting mirror (cf. infra).

The apparatus described hereinabove is used in two phases. In a first, so-called "direct" phase, the gun-layer aims the platform in the direction of the target, using on the one hand the control stick and on the other hand the sighting system 11 and the screen 52. Said latter may be an optical or thermal television camera (FLIR) or an optical sight provided at the output with an optical vehicle passing through the trunnions of the platform and whose eyepiece is within reach of the gun-layer's eye. If it is a thermal television camera (TV), the gun-layer observes the target on a screen or, if the screen is small, with the aid of an eyepiece.

The sight 11 is provided with a reticle 11' optically visible to the gun-layer (in the optical eyepiece or on the TV screen). This so-called "direct" phase is characterized by the fact that the optical axes of the illuminator 12, of the ADM device 13 and of the sight 11 are adjusted to be harmonized, i.e. mechanically or electrically, either strictly in parallel or with a predetermined convergence.

Once the target has been accurately aimed at by the gun-layer (said aiming facilitated by the gyroscopic stabilisation 22 which acts as mechanical or electrical low-pass filter), the gun-layer switches box 28 onto "corrected". Phase 2 is then entered into, during which the gun-layer maintains his sight, whilst the ADM device acts the role which has already been indicated hereinabove, in that it will produce a deviation signal if the centre of energy of illuminant light returned by the target does not merge with the centre of energy of impact of said light. This signal acting on the deflector 29 via two amplifiers 34, 35 makes the necessary correction on the direction of emission of the illuminator 12 so that it is the centre of energy of the returned light which coincides with the reticle maintained on the lens by the gun-layer, in accordance with the above-mentioned principle.

On the box 28 has been indicated a second aiming input 27' switchable via 28 with the input coming from the manual handle 27, and coming for example from an automatic target tracking. This detail does not form part of the invention, but advantageously completes the combination described. Similarly, the illuminator may, if desired, also carry out a range-finding function.

In the embodiment of FIG. 3, an optical reflector, e.g. a gyrostabilized flat mirror, disposed on the trajectory of the beams of the illuminator 41 of the sight 42 returns the light of the illuminator returned by the target, by reflection, to the ADM device 43. A two (or more) rotating prisms device 44 and a separator 45 are disposed on the trajectory of the light emitted by the illuminator, upstream of the mirror 40. The deviation signals delivered by the ADM device act on the range finder 44 via a suitable amplifier 46, comprising a switch 47.

The functioning of the device will be readily understood from FIG. 3. Using the control stick 48, the gun-layer acts on the gyrostabilized mirror 40 via amplifiers 34 and 35 and torque motors 36 and 37 connected to the gyroscope 38 for stabilizing the mirror, in azimuth and in elevation, and causes the image of the target which he observes simultaneously (trajectory referenced 49) to coincide with the the image of the reticle which arrives from the reticle generator 50 (trajectory 51). All harmonization adjustments made between the optical axis of the illuminator, the optical axis of the separator 43, the direction perpendicular to the mirror 40, the optical axis of the reticle generator, and the device 44 being in a determined position of adjustment (switch 47 in "off" position), the light beam 52 emitted by the illuminator arrives at the target centered on the reticle observed by the gun-layer and maintained by him on the target. By connecting the ADM device 43 to the device 44 (switch 47 in "on" position), in a second phase, the gun-layer then determines, if the ADM device has detected a deviation, a movement of the device 44 which, by deflecting the light beam emitted by the illuminator, will cause the centre of the reflected light to coincide with the reticle of the sight and not the centre of the incident light, thus obtaining the effect sought by the invention.

This embodiment is suitable for a day-sight. In particular, it presents the advantage of being able to be obtained by simple modification of a day-sight which already exists but which was heretofore not provided with corrector means.

The embodiment of FIG. 3 may be modified to allow a night-sight.

Such a modified embodiment is shown in FIG. 4 which illustrates a device taking a part of the device of FIG. 2 and a part of the device of FIG. 3.

This device comprises a day-sight 42, a night-sight 30, an illuminator 41 and an ADM device 31.

The day-sight and the illuminator are part of an assembly similar to that of FIG. 3, this assembly comprising in particular a gyrostabilized reflector, for example a mirror 33 which sends the beams from the illuminator towards the target and the image of the target towards the day-sight.

The night-sight 30 and the deviation measuring device 31 are mounted on a gyroscopic platform 32 as in the case of FIG. 2.

The deflector is constituted by the mirror 33 and means known per se are provided for the movements of the platform 32 to be reproduced by the mirror 33.

Trunnions 16 and 17, motors 18 and 19, amplifiers 20 and 21, the gyroscope 22 and its torque motors 23 and 24, the amplifiers 25, 26 associated therewith, the control stick 27, the switch box 28 and its auxiliary input 27' are found again in this Figure. However, the amplifiers 34, 35 control, in the present case, the torque motors 36 and 37 connected to the gyroscope 38 of the stabilised mirror 33 and adapted to rotate said mirror in a traversing movement and in an elevating movement by corresponding precession of the gyroscope 38.

This device functions as follows:

In a first, so-called "direct" phase (designated by A in the box 28), by acting on the control stick 27, the gun-layer aims the sight 30 or 42 on the target as has already been described above. The gyrostabilized mirror 33 reproduces the movements of the platform directly and, except for the deformations of the connecting structure, all prior harmonizations having been made, directs the beam of illuminating light towards the target. The ADM device 31 then detects a deviation symbolized at 39, sum of the deviations of light origin at the target and errors originating from the deformations of the structural connection between sighting platform and illuminator.

By acting on the switch 27' of the box 28, the gun-layer passes to the second, so-called "corrected" phase, by substituting an ADM device-mirror connection designated by B for the platform-mirror connection A.

The deviation signal from the ADM device then pilots the mirror in the direction annulling this deviation, consequently constantly returning the centre of energy of the illuminating light reflected where the reticle of the sight 30 is positioned on the target, notwithstanding the structural deformations of the carrying vehicle. The advantageous role of the mechanical filterings introduced by gyroscope 22 and 38 will be noted.

The invention is particularly applicable to the case of the sighting system and illuminator being on board a helicopter.

What is claimed is:

1. A method for correcting the aiming of target aiming apparatus that includes an optical illuminator directed at a target observed by means of a sighting system, wherein the aiming correction is in response to a difference between the direction of the reflected light from the target and the axes of the sighting system and the optical illuminator, said axes being harmonized to be parallel or of a predetermined convergence, the method comprising electro-optically detecting the direction of maximum light of the illuminator reflected by the target, measuring the angle formed by this direction and the sighting direction and utilizing the result of this measurement to control an orientation of the optical axis of the illuminator or of the optical axis of the sighting system with the result that the direction of maximum light of the illuminator reflected by the target coincides with the optical axis of the sighting system.

2. The method according to claim 1, wherein an angular deviation measuring device adapted to receive the light from the illuminator reflected by the target is used as detector.

3. The method according to claim 2, said angular deviation measuring device supplying a deviation signal characterizing the angle existing between its optical axis and the direction in which it receives the maximum of reflected light.

4. The method according to claim 3, wherein said deviation signals are used for controlling an orientation of the optical axis of the illuminator so that the maximum of reflected light comes onto the axis of the sighting system.

5. The method according to claim 3, wherein said deviation signals are used for controlling an orientation of the optical axis of the sighting system so that the maximum of reflected light is in the axis of the sighting system.

6. The method according to claim 1 wherein the direction of the maximum reflected light originates from a first target point different than a second target point corresponding to the point of intersection of the optical axis of the illuminator and the target.

7. The method according to claim 1 wherein the optical axis of the illuminator is harmonized with the optical axis of the sighting system and the optical axis of the angular deviation measuring device, the difference between the normally harmonized arranged axes of the illuminator and the sighting system being due to an uncontrolled orientational shift from external uncontrolled factors, said angular deviation measuring device supplying an error signal characterizing the angle existing between the optical axis of the angular deviation measuring device and the direction of received maximum reflected light.

8. An apparatus for correcting the aiming of a target aiming system that includes an optical illuminator directed at a target observed by means of a sighting system, the axes of the illuminator and the sighting system being harmonised to be parallel or of a predetermined convergence, the aiming correcting apparatus comprising:

an angular deviation measuring device having an optical axis harmonized with the optical axis of the sighting system, said angular deviation measuring device being adapted to receive the light from the illuminator reflected by the target and to supply signals corresponding to the angular deviation existing between the optical axis of said sighting system and the direction of maximum reflected energy; and deflecting means being associated with said angular deviation measuring device for acting on the direction of the optical axis of the sighting system as a function of the signals from said angular deviation measuring device, in order to orientate the optical axis of the sighting system so that the direction of maximum light of the illuminator reflected by the target is in the axis of the sighting system.

9. The apparatus according to claim 8, wherein the deflecting means comprise an optical deflector controlled by the deviation signals from said angular deviation measuring device and placed on the trajectory of the sighting system.

10. The apparatus according to claim 8, wherein the deflecting means, the angular deviation measuring device, the illuminator and the sighting system are mounted on a gyrostablized platform.

11. The apparatus according to claim 8, whererin the deflecting means comprise a rotating prisms device controlled by the deviation signals from the angular deviation measuring device and placed on the trajectory of the beam of the sighting system, a gyrostablised optical reflector disposed on the trajectory of the beams of the illuminator, the sight, and said angular deviation measuring device for directing towards the target or receiving therefrom the respective light beams, said rotating prisms device being positioned between the observed sighting position of said sighting system and said optical reflector.

12. The apparatus according to claim 8 wherein said sighting system is a day sighting system, said deflecting means comprising a gyrostablized optical reflector controllable by the deviation signals from said angular deviation measuring device and sending the beam from the illuminator to the target and the image of the target toward the sight of the day sighting system, said apparatus further comprising first means for mounting said day sighting system, said gyrostabilized optical reflector and said illuminator, second means including a gyrostabilized platform for mounting said angular deviation measuring device, a night sighting system carried by said second mounting means, said first and second mounting means not being rigidly connected together, said reflector reproducing movements of said gyrostabilized platform.

13. The apparatus according to claim 8, wherein the deflecting means comprises a rotating prisms device controlled by the deviation signals from the angular deviation measuring device and placed on the trajectory of the beam of the sighting system.

14. The apparatus according to claim 13 further comprising a gyrostabilized optical reflector disposed on the trajectory of the beam of the illuminator, the sight, and said angular deviation measuring device for directing towards the target or receiving therefrom the respective light beams, said rotating prisms device being positioned between the observer sighting position of said sighting system and said gyrostabilized optical reflector.

15. A method for correcting the aiming of a target aiming device that comprises an optical illuminator directing onto the target an incident light and a sighting system for observing the target, said illumination and said sighting system being harmonised to have optical axes that are parallel or of a predetermined convergence, the method comprising electro-optically detecting the direction of maximum light of the illuminator reflected by the target, measuring the angle formed between this detected direction and the sighting direction, and utilizing the result of this measurement to control orientation of the optical axis of the illuminator or of the optical axis of the sighting system with the result that the direction of maximum light of the illuminator reflected by the target coincides with the optical axis of the sighting system.

* * * * *